(12) United States Patent
Chan et al.

(10) Patent No.: US 11,424,783 B2
(45) Date of Patent: Aug. 23, 2022

(54) TRANSCEIVER HAVING RADIO-FREQUENCY FRONT-END CIRCUIT, DEDICATED RADIO-FREQUENCY FRONT-END CIRCUIT, AND SWITCHABLE MATCHING CIRCUIT INTEGRATED IN SAME CHIP

(71) Applicant: MEDIATEK INC., Hsin-Chu (TW)

(72) Inventors: Wei-Chia Chan, Hsinchu (TW);
Tse-Yu Chen, Hsinchu (TW);
Hui-Hsien Liu, Hsinchu (TW); Jui-Lin Hsu, Hsinchu (TW); Chun-Wei Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/129,823

(22) Filed: Dec. 21, 2020

(65) Prior Publication Data

US 2021/0203373 A1 Jul. 1, 2021

Related U.S. Application Data

(60) Provisional application No. 62/954,017, filed on Dec. 27, 2019.

(51) Int. Cl.
*H04B 1/44* (2006.01)
*H04B 1/04* (2006.01)

(52) U.S. Cl.
CPC ..................... *H04B 1/44* (2013.01)

(58) Field of Classification Search
CPC .... H04B 1/0053; H04B 1/006; H04B 1/0067; H04B 1/0458; H04B 1/123; H04B 1/38;
(Continued)

(56) References Cited

U.S. PATENT DOCUMENTS

| 8,514,021 B2 * | 8/2013 | Heikkinen | ............... H03F 3/211 330/260 |
|---|---|---|---|
| 9,042,844 B2 | 5/2015 | Yu | |

(Continued)

FOREIGN PATENT DOCUMENTS

| CN | 103795353 A | 5/2014 |
|---|---|---|
| CN | 106487402 A | 3/2017 |

(Continued)

OTHER PUBLICATIONS

Taehwan Joo et al., A Fully Integrated RF CMOS Front-End IC for Connectivity Applications, IEEE Transactions on Circuits and Systems-II: Express Briefs, vol. 63, No. 11, Nov. 2016, pp. 1024-1028, XP011627121, 2016 IEEE, Nov. 2016.

(Continued)

*Primary Examiner* — Quochien B Vuong
(74) *Attorney, Agent, or Firm* — Winston Hsu

(57) ABSTRACT

A transceiver includes a radio-frequency (RF) front-end circuit, a dedicated RF front-end circuit, and a switchable matching circuit. The RF front-end circuit deals with communications of at least a first wireless communication standard. The dedicated RF front-end circuit deals with communications of a second wireless communication standard only. The switchable matching circuit is coupled to the RF front-end circuit, the dedicated RF front-end circuit, and a signal port of a chip. The switchable matching circuit provides impedance matching between the signal port and the RF front-end circuit when the RF front-end circuit is in operation, and provides impedance matching between the signal port and the dedicated RF front-end circuit when the dedicated RF front-end circuit is in operation. The RF front-end circuit, the dedicated RF front-end circuit, and the switchable matching circuit are integrated in the chip.

20 Claims, 6 Drawing Sheets

(58) Field of Classification Search
CPC ........ H04B 1/3827; H04B 1/40; H04B 1/401;
H04B 1/04; H04B 1/44; H03F 3/195;
H03F 2200/06; H03F 2200/09; H03F
2200/294; H03F 2200/318; H03F
2200/451
See application file for complete search history.

(56) References Cited

U.S. PATENT DOCUMENTS

| | | | |
|---|---|---|---|
| 9,083,293 B2* | 7/2015 | Chien | H03F 1/56 |
| 9,100,079 B2 | 8/2015 | Wu | |
| 9,337,990 B2* | 5/2016 | Narahashi | H04B 1/006 |
| 9,543,900 B1* | 1/2017 | Lin | H04B 1/0458 |
| 10,530,064 B2* | 1/2020 | Desclos | H01Q 5/335 |
| 10,686,421 B2* | 6/2020 | Nosaka | H04B 1/0458 |
| 2014/0087671 A1 | 3/2014 | Mostov | |
| 2014/0199951 A1 | 7/2014 | Yu | |
| 2015/0340769 A1 | 11/2015 | Desclos | |

FOREIGN PATENT DOCUMENTS

| | | |
|---|---|---|
| CN | 109525257 A | 3/2019 |
| EP | 3 280 047 A1 | 2/2018 |
| KR | 10-1488773 | 2/2015 |
| TW | 201322656 A1 | 6/2013 |
| TW | 201505385 A | 2/2015 |
| TW | I540849 B | 7/2016 |
| TW | 201946395 A | 12/2019 |
| WO | 2014/052417 A1 | 4/2014 |
| WO | 2019/050751 A1 | 3/2019 |

OTHER PUBLICATIONS

Yong-Seok Hwang et al., A 2 GHz and 5GHz Dual-Band Direct Conversion RF Front-End for Multi-Standard Applications, Proceedings 2005 IEEE International SOC Conference, 2005 IEEE, USA, pp. 189-192, XP010861196, 2005.
Renaldi Winoto et al., A WLAN and Bluetooth Combo Transceiver with Integrated WLAN Power Amplifier, Transmit-Receive Switch and WLAN/Bluetooth Shared Low Noise Amplifier, 2012 IEEE Radio Frequency Integrated Circuits Symposium, RTU2B-2, pp. 395-398, XP032203379, 2012 IEEE, 2012.
Bonhoon Koo et al.,"A Fully Integrated Dual-Mode CMOS Power Amplifier for WCDMA Applications",2012 IEEE International Solid-State Circuits Conference, ISSCC 2012 / Session 4 / RF Techniques / 4.5, 2012 IEEE, pp. 82-84, 2012.
Wu, A 28nm CMOS Wireless Connectivity Combo IC with a Reconfigurable 2×2 MIMO WiFi supporting 80 +80MHz 256-QAM, and BT 5.0, pp. 300-303, 2018 IEEE Radio Frequency Integrated Circuits Symposium.

* cited by examiner

TRANSCEIVER HAVING RADIO-FREQUENCY FRONT-END CIRCUIT, DEDICATED RADIO-FREQUENCY FRONT-END CIRCUIT, AND SWITCHABLE MATCHING CIRCUIT INTEGRATED IN SAME CHIP

CROSS REFERENCE TO RELATED APPLICATIONS

This application claims the benefit of U.S. provisional application No. 62/954,017, filed on Dec. 27, 2019 and incorporated herein by reference.

BACKGROUND

The present invention relates to wireless communications, and more particularly, to a transceiver having a radio-frequency (RF) front-end circuit, a dedicated RF front-end circuit, and a switchable matching circuit that are integrated in a same chip.

Industrial, scientific and medical (ISM) radio bands are radio bands reserved internationally for the use of RF energy for industrial, scientific and medical purposes other than telecommunications. In the field of wireless communication, the ISM band of 2.4 GHz is often used by different wireless technology standards, e.g. Bluetooth standard and WiFi standard. Even if the frequency band is crowded by different wireless technology standards, using the TDD (Time-Division Duplexing) technique to separate the operations of the Bluetooth communication and the WiFi communication into different time slots is still the main solution on the market. The Bluetooth communication and the WiFi communication may share a same antenna under TDD. In a conventional transceiver, an RF switch is a device arranged to switch between the Bluetooth communication and the WiFi communication. For example, an off-chip RF switch may be employed by a typical transceiver. However, the off-chip RF switch may cause higher production cost of the transceiver, and may occupy a large area of a PCB (Printed Circuit Board).

SUMMARY

One of the objectives of the claimed invention is to provide a transceiver having a radio-frequency (RF) front-end circuit, a dedicated RF front-end circuit, and a switchable matching circuit that are integrated in a same chip.

According to a first aspect of the present invention, an exemplary transceiver is provided. The exemplary transceiver includes a radio-frequency (RF) front-end circuit, a dedicated RF front-end circuit, and a switchable matching circuit. The RF front-end circuit is arranged to deal with communications of at least a first wireless communication standard. The dedicated RF front-end circuit is arranged to deal with communications of a second wireless communication standard only. The switchable matching circuit is coupled to the RF front-end circuit, the dedicated RF front-end circuit, and a signal port of a chip. The switchable matching circuit is arranged to provide impedance matching between the signal port and the RF front-end circuit when the RF front-end circuit is in operation, and provide impedance matching between the signal port and the dedicated RF front-end circuit when the dedicated RF front-end circuit is in operation. The RF front-end circuit, the dedicated RF front-end circuit, and the switchable matching circuit are integrated in the chip.

According to a second aspect of the present invention, an exemplary transceiver is provided. The exemplary transceiver includes a plurality of circuits integrated in a chip. The circuits integrated in the chip includes: a first power amplifying circuit arranged to generate first differential output signals; a second power amplifying circuit arranged to generate second differential output signals; a first balance-unbalance (Balun) circuit arranged to convert the first differential output signals into a first single-ended output signal, wherein the first single-ended output signal is generated at a first output terminal of the first Balun circuit; a second Balun circuit arranged to convert the second differential output signals into a second single-ended output signal, wherein a first output terminal of the second Balun circuit is coupled to the signal port of the chip, and a second output terminal of the second Balun circuit is coupled to a reference voltage; a first low-noise amplifying circuit arranged to generate a first single-ended input signal; a second low-noise amplifying circuit arranged to generate a second single-ended input signal; a first capacitive circuit having a first terminal coupled to the signal port of the chip; a first switch circuit having a first terminal coupled to a second terminal of the first capacitive circuit and the first output terminal of the first Balun circuit, and a second terminal coupled to the reference voltage; a second capacitive circuit having a first terminal coupled to a second output terminal of the first Balun circuit; a second switch circuit having a first terminal coupled to a second terminal of the second capacitive circuit and a second terminal coupled to the reference voltage; a first inductive circuit having a first terminal coupled to the second terminal of the second capacitive circuit and a second terminal coupled to the first low-noise amplifying circuit; a second inductive circuit having a first terminal coupled to the signal port and a second terminal coupled to the second low-noise amplifying circuit; and a third switch circuit having a first terminal coupled to the second terminal of the second inductive circuit and a second terminal coupled to the reference voltage.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
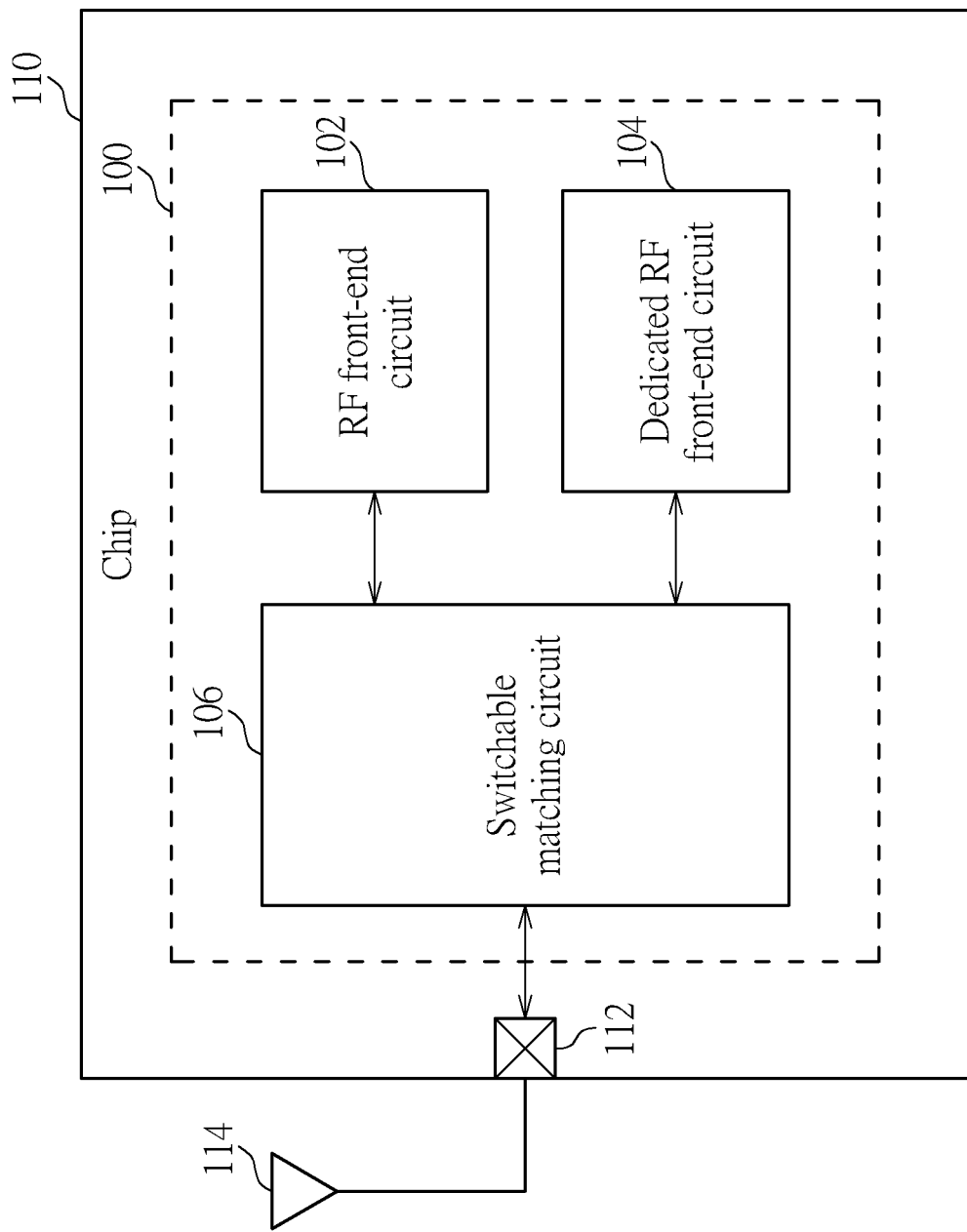
FIG. 1 is a block diagram illustrating a transceiver according to an embodiment of the present invention.

FIG. 1 is a block diagram illustrating a transceiver according to an embodiment of the present invention. The transceiver 100 includes a radio-frequency (RF) front-end circuit 102, a dedicated RF front-end circuit 104, and a switchable matching circuit 106. It should be noted that the RF front-end circuit 102, the dedicated RF front-end circuit 104, and the switchable matching circuit 106 are integrated in a same chip 110. The RF front-end circuit 102 may be either a shared RF front-end circuit or a dedicated RF front-end circuit, depending upon the actual design considerations. In one exemplary design, the RF front-end circuit 102 may be designed to be a shared RF front-end circuit that is arranged to deal with communications of different wireless communication standards (e.g., a first wireless communication standard and a second wireless communication standard). In another exemplary design, the RF front-end circuit 102 may be designed to be a dedicated RF front-end circuit that is arranged to deal with communications of a single wireless communication standard (e.g., the first wireless communication standard) only. The dedicated RF front-end circuit 104 is arranged to deal with communications of only a single wireless communication standard (e.g., the second wireless communication standard). For example, the first wireless communication standard may be a wireless fidelity (WiFi) standard, and the second wireless communication standard may be a Bluetooth (BT) standard.

The switchable matching circuit 106 is coupled to the RF front-end circuit 102, the dedicated RF front-end circuit 104, and a signal port 112 of the chip 110. In addition to impedance matching, the switchable matching circuit 106 supports an on-chip RF switch function. For example, the signal port 112 is an antenna port shared by communications of different wireless communication standards (e.g., WiFi standard and BT standard), and the switchable matching circuit 106 is coupled to an external antenna 114 via the signal port 112. In this embodiment, the switchable matching circuit 106 is arranged to provide impedance matching between the signal port 112 and the RF front-end circuit 102 when the RF front-end circuit 102 is in operation, and provide impedance matching between the signal port 112 and the dedicated RF front-end circuit 104 when the dedicated RF front-end circuit 104 is in operation.

As mentioned above, the RF front-end circuit 102 can be a shared RF front-end circuit shared by communications of the first wireless communication standard and communications of the second wireless communication standard. For example, the RF front-end circuit 102 is designed to meet the communication requirements of the first wireless communication standard (e.g., WiFi standard), and can be reused by communications of the second wireless communication standard (e.g., BT standard). In this embodiment, the dedicated RF front-end circuit 104 is dedicated to dealing with communications of the second wireless communication standard (e.g., BT standard). Since circuit elements of the RF front-end circuit 102 consumes larger current when being involved in communications of the second wireless communication standard (e.g., BT standard), current consumption of communications of the second wireless communication standard (e.g., BT standard) that are achieved through the dedicated RF front-end circuit 104 is much lower than current consumption of communications of the second wireless communication standard (e.g., BT standard) that are achieved through the RF front-end circuit 102. For example, the dedicated RF front-end circuit 104 may be used to deal with a BT TX mode and/or a dedicated BT RX mode (RX mode) for low power consumption, and the RF front-end circuit 102 may be used to deal with a normal BT RX mode for better receiver sensitivity. Further circuit details of the proposed transceiver having a shared RF front-end circuit, a dedicated RF front-end circuit, and a switchable matching circuit that are integrated in a same chip are described as below.

Figure 2:
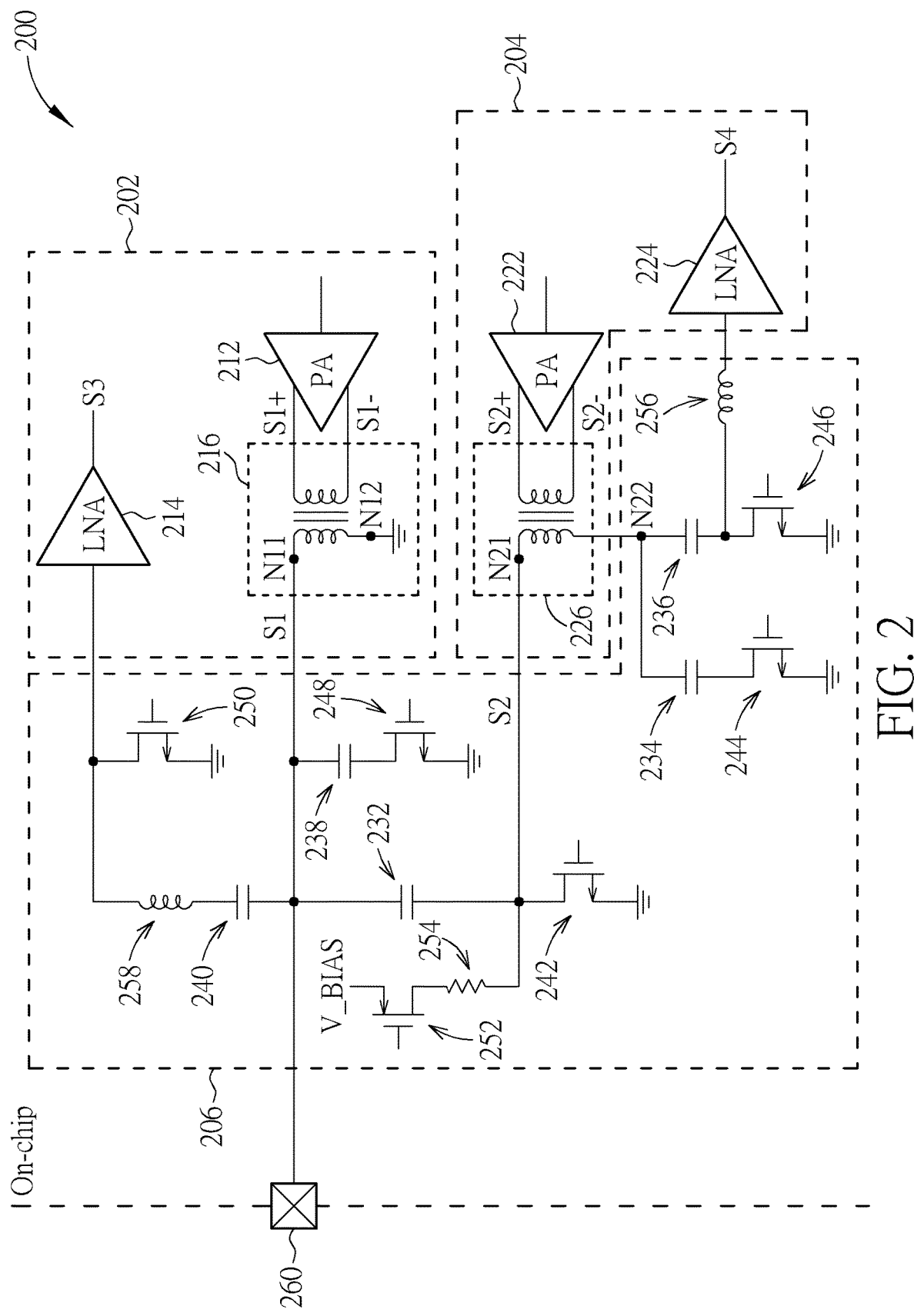
FIG. 2 is a circuit diagram of a transceiver according to an embodiment of the present invention.

FIG. 2 is a circuit diagram of a transceiver according to an embodiment of the present invention. The function blocks shown in FIG. 1 may be implemented by circuit elements shown in FIG. 2. Like the transceiver 100, the transceiver 200 includes an RF front-end circuit configured as a shared RF front-end circuit 202, a dedicated RF front-end circuit 204, and a switchable matching circuit 206 that are integrated in a same chip. The shared RF front-end circuit 202 includes a power amplifying circuit (denoted by "PA") 212, a low-noise amplifying circuit (denoted by "LNA") 214, and a balance-unbalance (Balun) circuit 216. The power amplifying circuit 212 is arranged to generate differential output signals (S1+, S1−) during a TX mode of the shared RF front-end circuit 202. The Balun circuit 216 is arranged to convert the differential output signals (S1+, S1−) into a single-ended output signal S1 during the TX mode of the shared RF front-end circuit 202. The low-noise amplifying circuit 214 is arranged to generate a single-ended input signal S3 during an RX mode of the shared RF front-end circuit 202.

The dedicated RF front-end circuit 204 includes a power amplifying circuit (denoted by "PA") 222, a low-noise amplifying circuit (denoted by "LNA") 224, and a Balun circuit 226. The power amplifying circuit 222 is arranged to generate differential output signals (S2+, S2−) during a TX mode of the dedicated RF front-end circuit 204. The Balun circuit 226 is arranged to convert the differential output signals (S2+, S2−) into a single-ended output signal S2 during the TX mode of the dedicated RF front-end circuit 204. The low-noise amplifying circuit 224 is arranged to generate a single-ended input signal S4 during an RX mode of the dedicated RF front-end circuit 204.

The circuit structure shown in FIG. 2 is for illustrative purposes only, and is not meant to be a limitation of the present invention. Alternatively, the transceiver 200 may be modified to have the shared RF front-end circuit 202 replaced with a dedicated RF front-end circuit such as a dedicated WiFi RF front-end circuit.

It should be noted that only the circuit elements pertinent to the present invention are shown in FIG. 2. In practice, the shared RF front-end circuit 202 may include other circuit elements (e.g., mixers and filters), and the dedicated RF front-end circuit 204 may include other circuit elements (e.g., mixers and filters).

The switchable matching circuit 206 includes a plurality of capacitive circuits 232, 234, 236, 238, 240, a plurality of switch circuits 242, 244, 246, 248, 250, 252, a resistive circuit 254, and a plurality of inductive circuits 256, 258. By way of example, but not limitation, each of the capacitive circuits 232, 234, 236, 238, 240 may be implemented by one or more capacitors, each of the switch circuits 242, 244, 246, 248, 250, 252 may be implemented by one or more metal-oxide-semiconductor field-effect transistors (MOSFETs), the resistive circuit 254 may be implemented by one or more resistors, and/or each of the inductive circuits 256, 258 may be implemented by one or more inductors.

It should be noted that the capacitive circuits 238, 240 and the switch circuit 248 may be optional. In one alternative design, the capacitive circuit 240 may be omitted, such that one terminal of the inductive circuit 258 is coupled to the signal port 260 without via any capacitive circuit. In another alternative design, the capacitive circuit 238 and the switch circuit 248 may be omitted. In yet another alternative design, the capacitive circuits 238, 240 and the switch circuit 248 may be omitted. The following assumes that the capacitive circuits 238, 240 and the switch circuit 248 are implemented in the transceiver 200 for optimum performance. However, this is for illustrative purposes only, and is not meant to be a limitation of the present invention.

The capacitive circuit 232 has a first terminal coupled to a signal port 260 of a chip. The switch circuit 242 has a first terminal coupled to a second terminal of the capacitive circuit 232 and a first output terminal N21 of the Balun circuit 226, and has a second terminal coupled to a reference voltage (e.g., ground voltage), where the single-ended output signal S2 is generated at the first output terminal N21 of the Balun circuit 226. The capacitive circuit 236 has a first terminal coupled to a second output terminal N22 of the Balun circuit 226. The switch circuit 246 has a first terminal coupled to a second terminal of the capacitive circuit 236, and has a second terminal coupled to the reference voltage (e.g., ground voltage). The inductive circuit 256 has a first terminal coupled to the second terminal of the capacitive circuit 236, and has a second terminal coupled to an input node of the low-noise amplifying circuit 224.

The capacitive circuit 238 has a first terminal coupled to a first output terminal N11 of the Balun circuit 216, where the single-ended output signal S1 is generated at the first output terminal N11 of the Balun circuit 216, and a second output terminal N12 of the Balun circuit 216 is coupled to the reference voltage (e.g., ground voltage). The switch circuit 248 has a first terminal coupled to a second terminal of the capacitive circuit 238, and has a second terminal coupled to the reference voltage (e.g., ground voltage).

The capacitive circuit 240 has a first terminal coupled to the signal port 260. The inductive circuit 258 has a first terminal coupled to a second terminal of the capacitive circuit 240, and has a second terminal coupled to an input node of the low-noise amplifying circuit 214. The switch circuit 250 has a first terminal coupled to the second terminal of the inductive circuit 258, and has a second terminal coupled to the reference voltage (e.g., ground voltage).

The switch circuit 252 has a first terminal coupled to a bias voltage V_BIAS. The resistive circuit 254 has a first terminal coupled to a second terminal of the switch circuit 252, and has a second terminal coupled to the first terminal of the switch circuit 242. The capacitive circuit 234 has a first terminal coupled to the second output terminal N21 of the Balun circuit 226. The switch circuit 244 has a first terminal coupled to a second terminal of the capacitive circuit 234, and has a second terminal coupled to the reference voltage (e.g., ground voltage).

An external antenna (e.g., antenna 114 shown in FIG. 1) is connected to the signal port 260 of a chip in which the shared RF front-end circuit 202, the dedicated RF front-end circuit 204, and the switchable matching circuit 206 are integrated. The capacitive circuits 232, 234, 236, 238, 240, resistive circuit 254, and inductive circuits 256, 258 may be properly designed/set/adjusted to ensure impedance matching between the external antenna and the Balun circuit 216 during the TX mode of the shared RF front-end circuit 202, impedance matching between the external antenna and the low-noise amplifying circuit 214 during the RX mode of the shared RF front-end circuit 202, impedance matching between the external antenna and the Balun circuit 226 during the TX mode of the dedicated RF front-end circuit 204, and impedance matching between the external antenna and the low-noise amplifying circuit 224 during the RX mode of the dedicated RF front-end circuit 202. Hence, during the TX mode of the shared RF front-end circuit 202, the single-ended output signal S1 (which may be a WiFi RF signal or a BT RF signal) can be transmitted from the Balun circuit 216 to the external antenna without degradation or power loss; during the RX mode of the shared RF front-end circuit 202, an input signal (which may be a WiFi RF signal or a BT RF signal) received by the external antenna can be transmitted to the low-noise amplifying circuit 214 without degradation or power loss; during the TX mode of the dedicated RF front-end circuit 204, the single-ended output signal S2 (which may be a BT RF signal) can be transmitted from the Balun circuit 226 to the external antenna without degradation or power loss; and during the RX mode of the dedicated RF front-end circuit 204, an input signal (which may be a BT RF signal) received by the external antenna can be transmitted to the low-noise amplifying circuit 224 without degradation or power loss.

Since the same signal port 260 is shared by TX mode and RX mode of the shared RF front-end circuit 202 and TX mode and RX mode of the dedicated RF front-end circuit 204, the switch circuits 242, 246, 248, 250 should be properly controlled to enable a signal path needed by any of TX mode and RX mode of the shared RF front-end circuit 202 and TX mode and RX mode of the dedicated RF front-end circuit 204.

The shared RF front-end circuit 202 is arranged to deal with communications of different wireless communication standards (e.g., a first wireless communication standard and a second wireless communication standard). The dedicated RF front-end circuit 204 is arranged to deal with communications of only a single wireless communication standard (e.g., the second wireless communication standard). For better understanding of technical features of the present invention, the following assumes that the first wireless communication standard is a WiFi standard, and the second wireless communication standard is a BT standard. However, this is for illustrative purposes only, and is not meant to be a limitation of the present invention. Any transceiver using the proposed architecture falls within the scope of the present invention.

Figure 3:
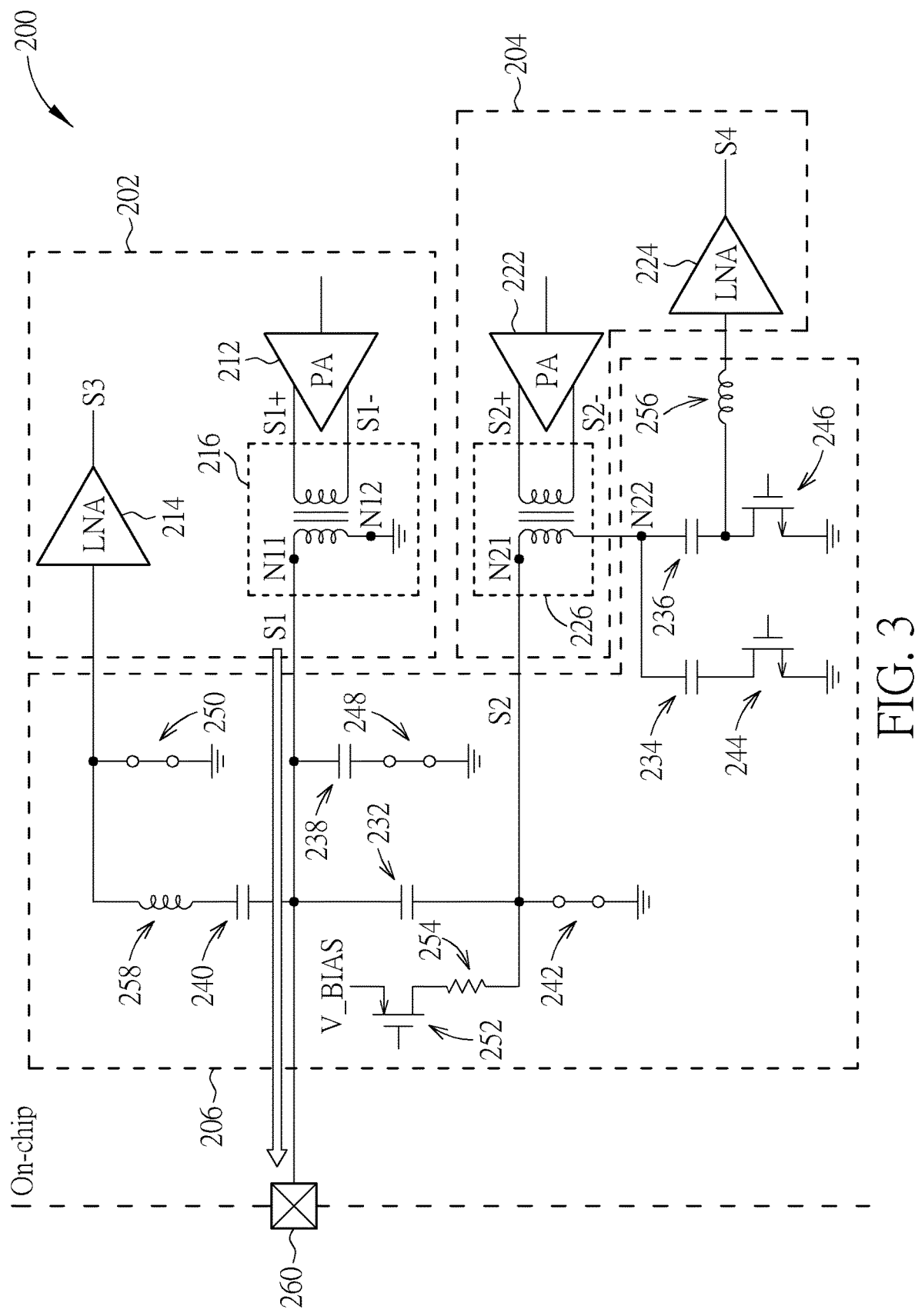
FIG. 3 is a diagram illustrating a configuration of the transceiver operating under a WiFi TX mode according to an embodiment of the present invention.

FIG. 3 is a diagram illustrating a configuration of the transceiver 200 operating under a WiFi TX mode according to an embodiment of the present invention. When the transceiver 200 enters the WiFi TX mode for transmitting the single-ended output signal S1 to the external antenna (e.g., antenna 114 shown in FIG. 1) via the signal port 260, the switch circuits 242, 248, and 250 are switched on, and the switch circuit 252 is switched off, where the switch circuits 244 and 246 may be switched on or switched off, depending upon design considerations. In addition, the power amplifying circuit 222 and the low-noise amplifying circuits 214, 224 may be disabled or powered off for saving power. When the switch circuit 242 is switched on, the dedicated BT TX/RX path is pulled low to do protection. In this embodiment, the capacitive circuit 238 may be implemented by a capacitor array. When the switch circuit 248 is switched on, the capacitor array is pulled low. When the switch circuit 250 is switched on, the shared WiFi/BT RX path is pulled low to do protection.

Figure 4:
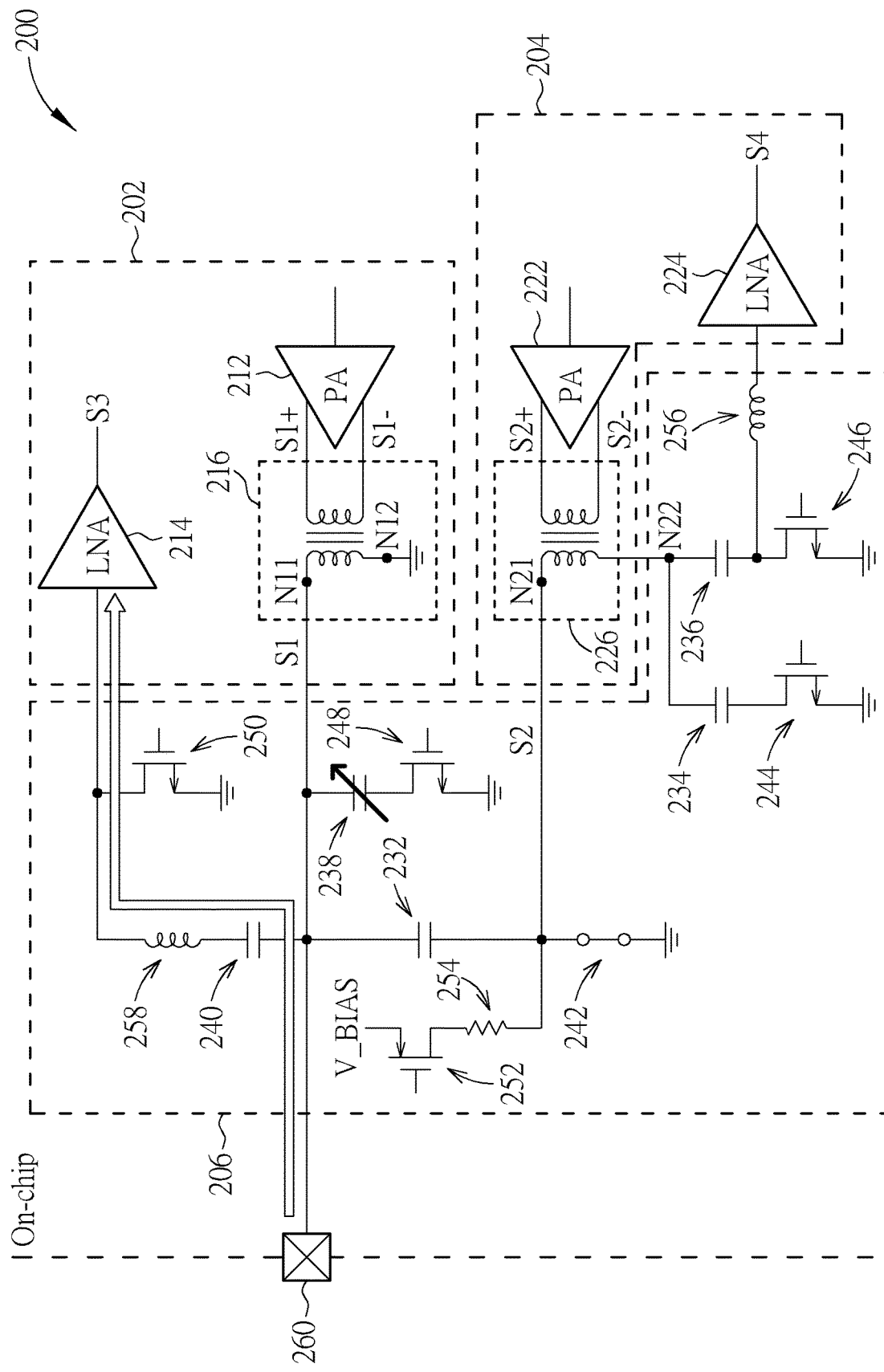
FIG. 4 is a diagram illustrating a configuration of the transceiver operating under a WiFi/BT RX mode according to an embodiment of the present invention.

FIG. 4 is a diagram illustrating a configuration of the transceiver 200 operating under a WiFi/BT RX mode according to an embodiment of the present invention. When the transceiver 200 enters the WiFi/BT RX mode for transmitting an input signal (which is a WiFi RF signal or a BT RF signal) received from the external antenna (e.g., antenna 114 shown in FIG. 1) to the low-noise amplifying circuit 214, the switch circuit 242 is switched on, the switch circuits 250 and 252 are switched off, and the switch circuit 248 is controlled to select a capacitance value of the capacitive circuit 238 (which is implemented by a capacitor array), where the switch circuits 244 and 246 may be switched on or switched off, depending upon design considerations. In addition, the power amplifying circuits 212, 222 and the low-noise amplifying circuit 224 may be disabled or powered off for saving power. When the switch circuit 242 is switched on, the dedicated BT TX/RX path is pulled low to do protection by making the dedicated RF front-end circuit 204 be equivalent to a capacitive load that does not induce loss for the shared RF front-end circuit 202. The switch circuit 248 selects a capacitance value of the capacitive circuit 238 for RX optimization. That is, the switch circuit 248 and the capacitive circuit 238 (which is implemented by a capacitor array) can be used for impedance matching tuning.

Figure 5:
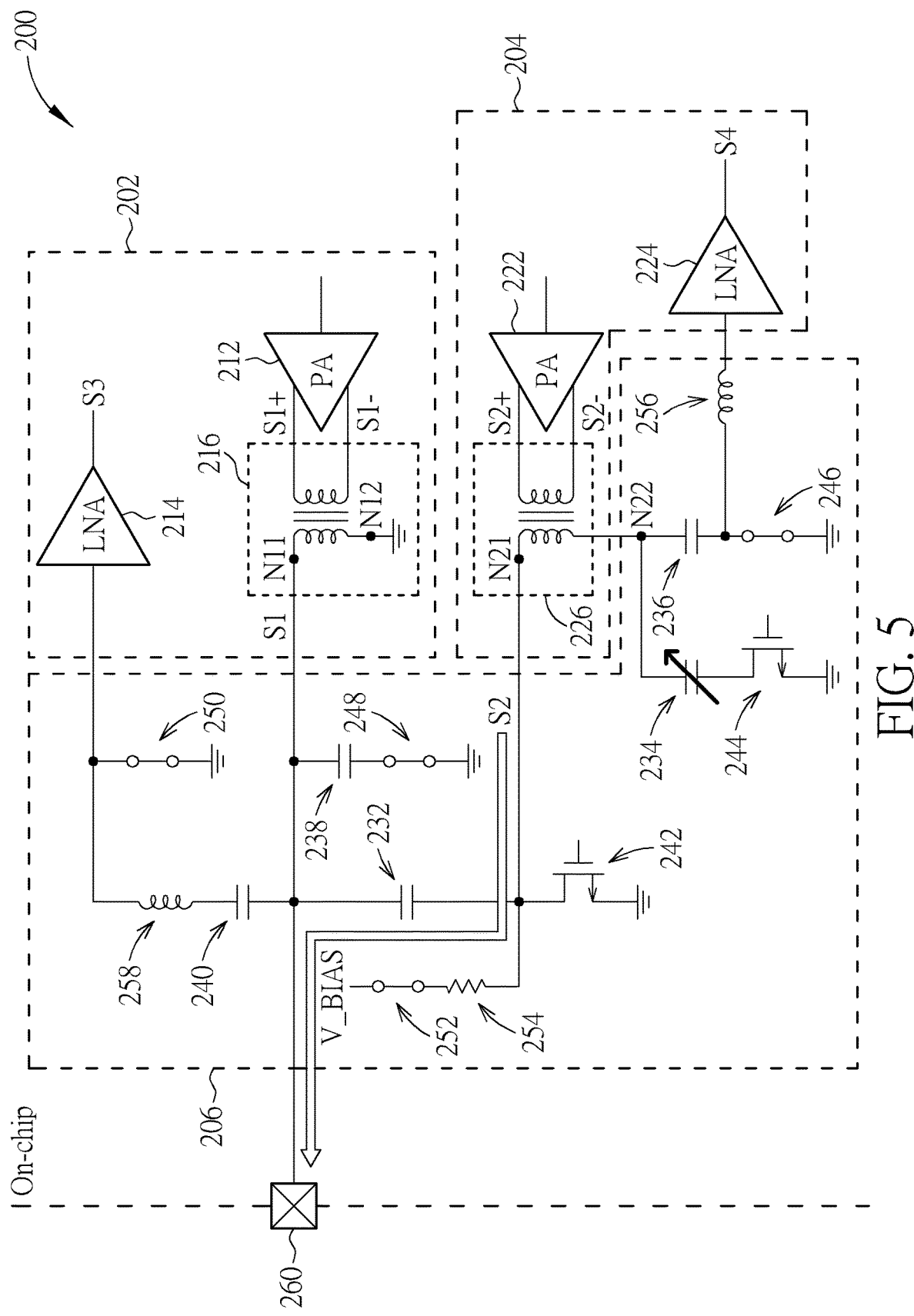
FIG. 5 is a diagram illustrating a configuration of the transceiver operating under a BT TX mode according to an embodiment of the present invention.

FIG. 5 is a diagram illustrating a configuration of the transceiver 200 operating under a BT TX mode according to an embodiment of the present invention. When the transceiver 200 enters the BT TX mode for transmitting the single-ended output signal S2 to the external antenna (e.g., antenna 114 shown in FIG. 1) via the signal port 260, the switch circuits 246, 248, 250, and 252 are switched on, the switch circuit 242 is switched off, and the switch circuit 244 is controlled to select a capacitance value of the capacitive circuit 234 (which is implemented by a capacitor array). In addition, the power amplifying circuit 212 and the low-noise amplifying circuits 214, 224 may be disabled or powered off for saving power. When the switch circuit 246 is switched on, the dedicated BT RX path is pulled low to do protection. As mentioned above, the capacitive circuit 238 may be implemented by a capacitor array. When the switch circuit 248 is switched on, the capacitor array of the capacitive circuit 238 is pulled low. When the switch circuit 250 is switched on, the shared WiFi/BT RX path is pulled low to do protection. When the switch circuit 252 is switched on, the bias voltage V_BIAS is provided to prevent the switch circuit 242 from being switched on or damaged. The switch circuit 244 selects a capacitance value of the capacitive circuit 234 for different BT target power. That is, the switch circuit 244 and the capacitive circuit 234 (which is implemented by a capacitor array) can be used for impedance matching tuning. For example, when higher BT target power is requested, the impedance can be reduced through capacitance value selection made by the switch circuit 244; and when lower BT target power is requested, the impedance can be increased through capacitance value selection made by the switch circuit 244.

Figure 6:
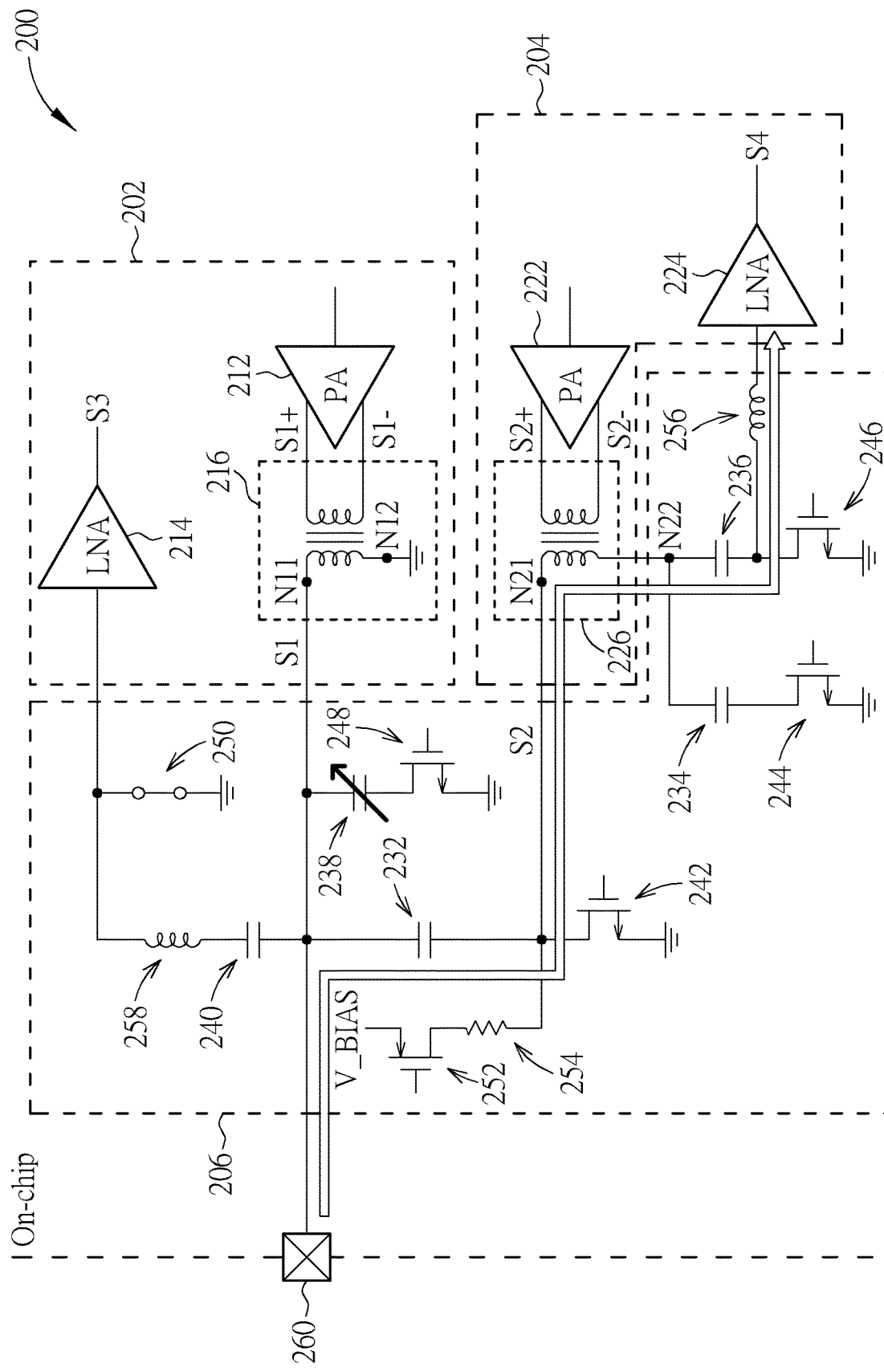
FIG. 6 is a diagram illustrating a configuration of the transceiver operating under a dedicated BT RX mode (RX mode) according to an embodiment of the present invention.

FIG. 6 is a diagram illustrating a configuration of the transceiver 200 operating under a dedicated BT RX mode (RX mode) according to an embodiment of the present invention. When the transceiver 200 enters the dedicated BT RX mode (RX mode) for transmitting an input signal (which is a BT RF signal) received from the external antenna (e.g., antenna 114 shown in FIG. 1) to the low-noise amplifying circuit 224, the switch circuit 250 is switched on, the switch circuits 242, 244, 246, and 252 are switched off, and the switch circuit 248 is controlled to select a capacitance value of the capacitive circuit 238 (which is implemented by a capacitor array). In addition, the power amplifying circuits 212, 222 and the low-noise amplifying circuit 214 may be disabled or powered off for saving power. When the switch circuit 250 is switched on, the shared WiFi/BT RX path is pulled low to do protection. The switch circuit 248 selects a capacitance value of the capacitive circuit 238 for RX optimization. That is, the switch circuit 248 and the capacitive circuit 238 (which is implemented by a capacitor array) can be used for impedance matching tuning.

Since the RF switch is integrated in a chip, the BOM (bill of materials) cost can be reduced. With the help of the dedicated RF front-end circuit, the power amplifying circuit and the low-noise amplifying circuit designed for WiFi communications are not required to be reused by BT TX mode and dedicated BT RX mode (RX mode). In this way, the dedicated BT RX mode (RX mode) current can be reduced, and the BT TX mode current can be reduced. Furthermore, the WiFi performance is not degraded by the switchable matching circuit integrated in the chip. Specifically, compared to an off-chip RF switch used by a typical transceiver, an on-chip RF switch (which is implemented by switchable matching circuit 106/206) of the proposed transceiver causes lower loss for WiFi TX mode and WiFi RX mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver comprising:
   a radio-frequency (RF) front-end circuit, arranged to deal with communications of at least a first wireless communication standard;
   a dedicated RF front-end circuit, arranged to deal with communications of a second wireless communication standard only, comprising:
   a power amplifying circuit, arranged to generate differential output signals during a transmit (TX) mode of the dedicated RF front-end circuit;
   a balance-unbalance (Balun) circuit, arranged to convert the differential output signals into a single-ended output signal during the TX mode of the dedicated RF front-end circuit; and
   a low-noise amplifying circuit, arranged to generate a single-ended input signal during a receive (RX) mode of the dedicated RF front-end circuit; and
   a switchable matching circuit, coupled to the RF front-end circuit, the dedicated RF front-end circuit, and a signal port of a chip, wherein the switchable matching circuit is arranged to provide impedance matching between the signal port and the RF front-end circuit when the RF front-end circuit is in operation, and provide impedance matching between the signal port and the dedicated RF front-end circuit when the dedicated RF front-end circuit is in operation, comprising:
   a first capacitive circuit, having a first terminal coupled to the signal port of the chip;
   a first switch circuit, having a first terminal coupled to a second terminal of the first capacitive circuit and a first output terminal of the Balun circuit, and a second terminal coupled to a reference voltage, wherein the single-ended output signal is generated at the first output terminal of the Balun circuit;
a second capacitive circuit, having a first terminal coupled to a second output terminal of the Balun circuit;
a second switch circuit, having a first terminal coupled to a second terminal of the second capacitive circuit and a second terminal coupled to the reference voltage; and
a first inductive circuit, having a first terminal coupled to the second terminal of the second capacitive circuit and a second terminal coupled to the low-noise amplifying circuit;
wherein the RF front-end circuit, the dedicated RF front-end circuit, and the switchable matching circuit are integrated in the chip.

2. The transceiver of claim 1, wherein the RF front-end circuit is a shared RF front-end circuit arranged to deal with communications of the first wireless communication standard and communications of the second wireless communication standard.

3. The transceiver of claim 1, wherein the RF front-end circuit is arranged to deal with communications of the first wireless communication standard only.

4. The transceiver of claim 1, wherein during the TX mode of the dedicated RF front-end circuit, the first switch circuit is switched off, and the second switch circuit is switched on.

5. The transceiver of claim 1, wherein during the RX mode of the dedicated RF front-end circuit, the first switch circuit is switched off, and the second switch circuit is switched off.

6. The transceiver of claim 1, wherein during a TX mode of the RF front-end circuit, the first switch circuit is switched on.

7. The transceiver of claim 1, wherein during an RX mode of the RF front-end circuit, the first switch circuit is switched on.

8. The transceiver of claim 1, wherein the switchable matching circuit further comprises:
a third switch circuit, having a first terminal coupled to a bias voltage; and
a resistive circuit, having a first terminal coupled to a second terminal of the third switch circuit and a second terminal coupled to the first terminal of the first switch circuit.

9. The transceiver of claim 8, wherein the third switch circuit is switched on during the TX mode of the dedicated RF front-end circuit.

10. The transceiver of claim 1, wherein the switchable matching circuit further comprises:
a third capacitive circuit, having a first terminal coupled to the second output terminal of the Balun circuit; and
a third switch circuit, having a first terminal coupled to a second terminal of the third capacitive circuit and a second terminal coupled to the reference voltage.

11. The transceiver of claim 10, wherein the third capacitive circuit comprises a capacitor array; and during the TX mode of the dedicated RF front-end circuit, the third switch circuit is controlled to select a capacitance value of the third capacitive circuit.

12. The transceiver of claim 1, wherein the RF front-end circuit comprises:

a power amplifying circuit, arranged to generate differential output signals during a transmit (TX) mode of the RF front-end circuit;
a balance-unbalance (Balun) circuit, arranged to convert the differential output signals into a single-ended output signal during the TX mode of the RF front-end circuit, wherein a first output terminal of the Balun circuit is coupled to the signal port of the chip, and a second output terminal of the Balun circuit is coupled to a reference voltage; and
a low-noise amplifying circuit, arranged to generate a single-ended input signal during a receive (RX) mode of the RF front-end circuit;
the switchable matching circuit further comprises:
a second inductive circuit, having a first terminal coupled to the signal port and a second terminal coupled to the low-noise amplifying circuit; and
a fourth switch circuit, having a first terminal coupled to the second terminal of the second inductive circuit and a second terminal coupled to the reference voltage.

13. The transceiver of claim 12, wherein the switchable matching circuit further comprises:
a third capacitive circuit, having a first terminal coupled to the signal port and a second terminal coupled to the first terminal of the second inductive circuit, such that the first terminal of the second inductive circuit is coupled to the signal port via the third capacitive circuit.

14. The transceiver of claim 12, wherein the switchable matching circuit further comprises:
a third capacitive circuit, having a first terminal coupled to the first output terminal of the Balun circuit of the RF front-end circuit; and
a fifth switch circuit, having a first terminal coupled to a second terminal of the third capacitive circuit and a second terminal coupled to the reference voltage.

15. The transceiver of claim 14, wherein during the TX mode of the RF front-end circuit, the fifth switch circuit is switched on, and the fourth switch circuit is switched on.

16. The transceiver of claim 14, wherein the third capacitive circuit comprises a capacitor array; and during the RX mode of the RF front-end circuit, the fifth switch circuit is controlled to select a capacitance value of the capacitive circuit, and the fourth switch circuit is switched off.

17. The transceiver of claim 14, wherein during a TX mode of the dedicated RF front-end circuit, the fifth switch circuit is switched on, and the fourth switch circuit is switched on.

18. The transceiver of claim 14, wherein the third capacitive circuit comprises a capacitor array; and during an RX mode of the dedicated RF front-end circuit, the fifth switch circuit is controlled to select a capacitance value of the capacitive circuit, and the fourth switch circuit is switched on.

19. The transceiver of claim 1, wherein the first wireless communication standard is a wireless fidelity (WiFi) standard, and the second wireless communication standard is a Bluetooth standard.

20. A transceiver comprising:
a plurality of circuits integrated in a chip, comprising:
a first power amplifying circuit, arranged to generate first differential output signals;
a second power amplifying circuit, arranged to generate second differential output signals;
a first balance-unbalance (Balun) circuit, arranged to convert the first differential output signals into a first single-ended output signal, wherein the first single-ended output signal is generated at a first output terminal of the first Balun circuit;

a second Balun circuit, arranged to convert the second differential output signals into a second single-ended output signal, wherein a first output terminal of the second Balun circuit is coupled to the signal port of the chip, and a second output terminal of the second Balun circuit is coupled to a reference voltage;

a first low-noise amplifying circuit, arranged to generate a first single-ended input signal;

a second low-noise amplifying circuit, arranged to generate a second single-ended input signal;

a first capacitive circuit, having a first terminal coupled to the signal port of the chip;

a first switch circuit, having a first terminal coupled to a second terminal of the first capacitive circuit and the first output terminal of the first Balun circuit, and a second terminal coupled to the reference voltage;

a second capacitive circuit, having a first terminal coupled to a second output terminal of the first Balun circuit;

a second switch circuit, having a first terminal coupled to a second terminal of the second capacitive circuit and a second terminal coupled to the reference voltage;

a first inductive circuit, having a first terminal coupled to the second terminal of the second capacitive circuit and a second terminal coupled to the first low-noise amplifying circuit;

a second inductive circuit, having a first terminal coupled to the signal port of the chip and a second terminal coupled to the second low-noise amplifying circuit; and a third switch circuit, having a first terminal coupled to the second terminal of the second inductive circuit and a second terminal coupled to the reference voltage.

* * * * *